Oct. 9, 1956  E. E. HOOD  2,765,678
TWO-SPEED COASTER BRAKE FOR BICYCLES AND THE LIKE
Filed May 19, 1955  2 Sheets-Sheet 1
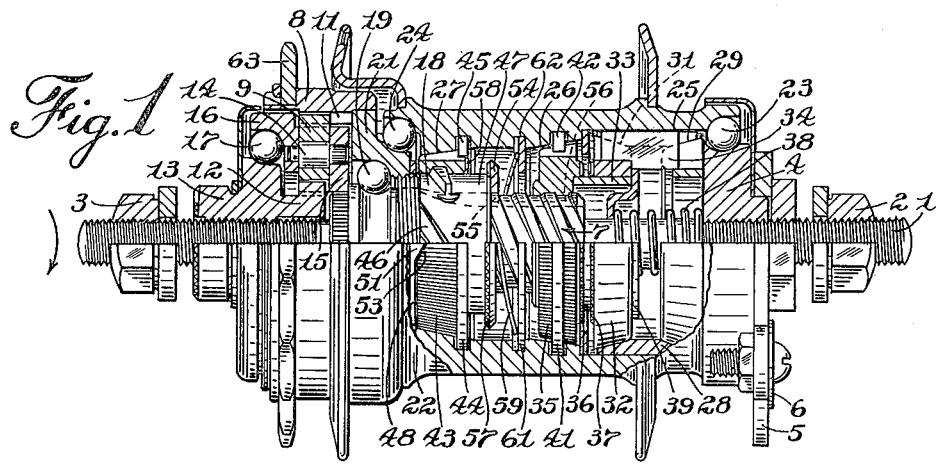
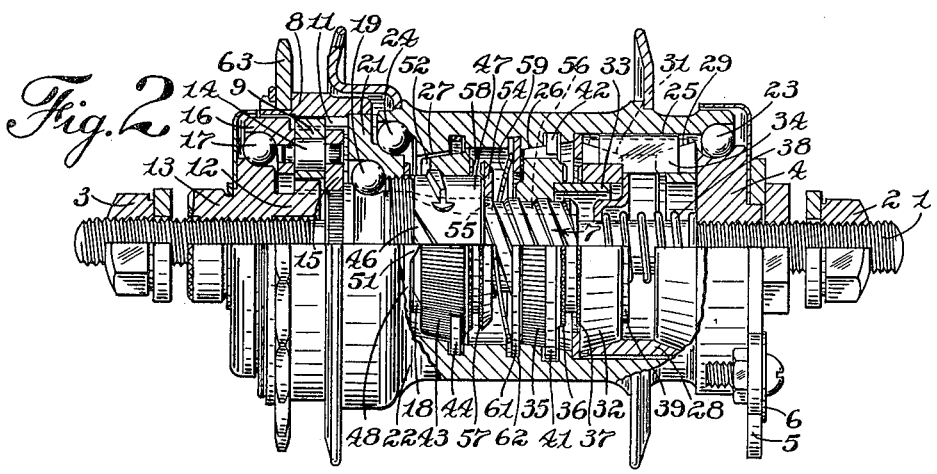
WITNESS:
Esther M. Stockton
INVENTOR.
Edwin Elliott Hood
BY
Clinton S. James
ATTORNEY Oct. 9, 1956    E. E. HOOD    2,765,678
TWO-SPEED COASTER BRAKE FOR BICYCLES AND THE LIKE
Filed May 19, 1955    2 Sheets-Sheet 2
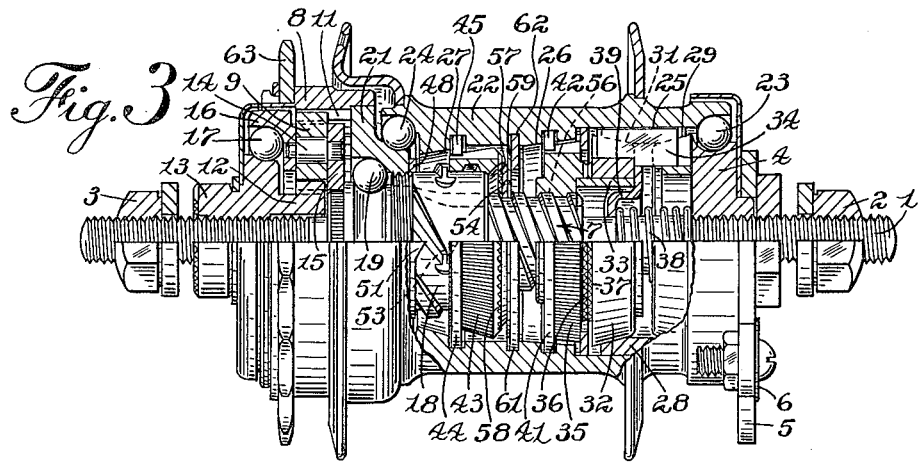
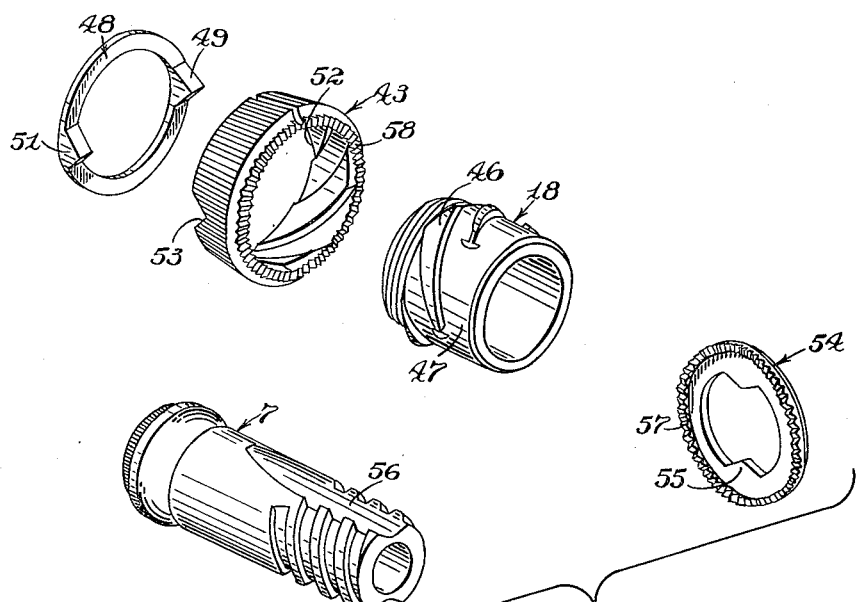
INVENTOR.
Edwin Elliott Hood
BY
ATTORNEY
WITNESS:

United States Patent Office 2,765,678
Patented Oct. 9, 1956

2,765,678
TWO-SPEED COASTER BRAKE FOR BICYCLES AND THE LIKE

Edwin Elliott Hood, Elmira, N. Y., assignor to Bendix Aviation Corporation, Elmira Heights, N. Y., a corporation of Delaware Application May 19, 1955, Serial No. 509,518

8 Claims. (Cl. 74—751)

The present invention relates to a two-speed coaster brake for bicycles and the like, and more particularly to variable speed gearing of this type which is selectively controlled by actuation of the bicycle pedals by the operator.

It is an object of the present invention to provide a novel two-speed hub brake which is a self-contained unit that is always completely under the control of the operator in that he can shift up or down at will, irrespective of the speed at which he is travelling at the time.

It is another object to provide such a device in which the desired gear ratio may be selected independently of load conditions.

It is another object to provide such a device which is so arranged that the operator may, if desired, coast and resume pedalling indefinitely and at any speeds without causing undesired change of gear ratio.

Further objects and advantages will be apparent from the following description taken in connection with the accompanying drawing in which:

Fig. 1 is a side elevation, partly broken away and in section of a preferred embodiment of the invention showing the parts in high gear driving position;

Fig. 2 is a similar view showing the parts in low gear driving position;

Fig. 3 is a similar view showing the parts in the positions assumed while shifting from one gear ratio to the other; and Fig. 4 is a detail in perspective of the low speed and high speed driving shafts with the high speed driving clutch and the control elements therefor shown in disassembled relation.

In Fig. 1 of the drawing there is illustrated an axle 1 adapted to be clamped in the rear fork of the frame of a bicycle, not illustrated, by means of clamp nuts 2 and 3. A brake anchor member 4 is threaded on the axle and is prevented from rotation by means of an arm 5 non-rotatably mounted thereon and having a clip 6 adapted to be attached to the frame of the bicycle.

A low speed driving screw shaft 7 is journalled on the axle 1 and is arranged to be rotated from a driving member 8 by means of reduction gearing including planet pinions 9 meshing in an orbit gear 11 formed in the inderior of the driving member 8 and engaging a sun gear 12 formed as part of a bearing member 13 threaded on the axle 1 and arranged to be non-rotatably clamped to the frame of the bicycle by means of the clamp nut 3. The planets 9 are rotatably mounted on pins 14 fixed at one end in a planet carrier ring 15 rigidly mounted on the end of the low speed screw shaft 7 and at their other ends piloted in a cone member 16 supported on bearings 17.

A high speed screw shaft 18 is rotatably mounted on the low speed screw shaft 7 by means of bearings 19, and has threaded thereon a coupling flange member 21 rigidly mounted in the driving member 8 whereby the high speed screw shaft is connected to rotate with the driving member.

A hub 22 is rotatably mounted at its ends on the anchor member 4 by means of bearings 23, and on the coupling member 21 by means of bearings 24. The hub is provided internally with a cylindrical braking surface 25, a tapered low speed clutch surface 26, and a tapered high speed clutch surface 27 of slightly smaller diameter in order to facilitate assembly of the parts.

Segmental brake shoes 28 are mounted on a tapered surface 29 of the anchor member 4, and a similar tapered surface 31 on an expander ring 32 which is slidably mounted on a sleeve 33. The brake shoes and the expander member 32 are prevented from rotation by means of rectangular keys 34 slidably received in slots in the anchor and expander members.

A low speed driving clutch member 35 is threaded on the low speed screw shaft 7 and is provided with a tapered periphery adapted to engage the low speed clutch surface 26 of the hub. The low speed driving clutch member also serves as a brake applying member, and for this purpose is provided with teeth 36 adapted to engage similar teeth 37 formed on the expander member 32. The low speed driving clutch member is counterbored to receive the sleeve 33 which preferably has a press fit therein. Means for yieldingly controlling the engagement of the teeth 36, 37 is provided in the form of a compression spring 38 and a dished thrust washer 39 bearing against the end of the sleeve 33 and the expander member 32. A spring drag ring 41 is arranged to bear frictionally in the interior of the hub 22 and is provided with a tongue 42 extending into a slot in the low speed driving clutch member in order to form a light frictional connection between the hub and said clutch member.

A high speed driving clutch member 43 is threaded on the high speed screw shaft 18 and is provided with a conical periphery for engagement with the clutch surface 27 in the hub 22. A spring drag ring 44 bearing frictionally in the interior of the hub has a tongue 45 engaging in a slot in the high speed driving clutch member to form a light frictional connection therebetween.

By reference more particularly to Fig. 4 of the drawing it will be noted that the high speed driving screw shaft 18 is provided with a thread having four leads 46 which terminate at an intermediate point on the shaft 18 thus leaving a smooth portion 47. The screw shaft and clutch member 43 are so proportioned that the clutch member can run off the ends of the threads 46 and rotate freely on the smooth portion 47.

An abutment member in the form of a spacing ring 48 is rigidly mounted on the high speed screw shaft 18 in any suitable manner as by a brazing operation after the coupling flange 21 is threaded on said screw shaft. Spacing ring 48 is provided with diametrically arranged longitudinally extending tapered projections 49, 51, and the clutch member 43 is provided wtih corresponding recesses 52, 53 adapted to receive said projections when brought into registry therewith. These parts are so proportioned that when the projections of the spacing ring 48 register with and are received by the recesses 52, 53 in the clutch member 43, the latter is free to move to the left on its screw shaft to engage the clutch surface 27 of the hub and transmit rotation thereto; whereas when said projections and recesses are out of registry, the projections 49, 51 arrest the engaging movement of said clutch member and prevent it from engaging the hub.

Means under the control of the operator are provided for indexing clutch member 43 on its screw shaft 18 to optionally bring it into or out of position where its recesses register with the projections of the spacing ring 48. As here shown this is accomplished by means of a clutch ring 54 splined on the low speed screw shaft 7 by means of internal projections 55 slidably received in grooves 56 in the low speed screw shaft; and provided with teeth 57 adapted to engage similar teeth 58 formed on the adjacent end of the clutch member 43. A spring washer 59 is located between the clutch ring 54 and a thrust ring 61 located in a groove 62 in the interior of the hub 22 and serves to yieldingly press the clutch ring against the end of the high speed screw shaft 18.

In the operation of the device, starting with the parts in the positions shown in Fig. 1, forward rotation, in the direction of the arrow, of the driving member 8 by means of sprocket 63 is transmitted to the high speed screw shaft 18, whereby the high speed clutch member 43 is traversed to the left into driving engagement with the surface 27 of the hub to rotate the hub at the same speed as the driving member. At this time, the low speed screw shaft 7, is rotated through the reduction gearing 9 in the direction to also traverse the low speed driving clutch member 35 in the direction to engage the hub, but since the hub is rotating faster than the low speed screw shaft, the frictional drag ring 41 tends to rotate the low speed clutch member 35 faster than its screw shaft 7 and consequently holds it in its rearward position as illustrated in Fig. 1.

If the operator stops pedalling and permits the bicycle to coast, the rotation of the high speed screw shaft 18 stops, and the high speed clutch member 43 is backed away from its engaging position until its backward movement is stopped by engagement with the clutch ring 54 which of course is also stationary. In this position, the clutch member 43 is still in engagement with the threads 46 of its screw shaft, consequently if the operator resumes pedalling, operation in high gear will continue.

If now the operator desires to shift into low gear he first coasts as above and then rotates the pedals backward slightly. When this happens, the high speed screw shaft 18 rotates backward relative to the low speed screw shaft which is rotating backward at reduced speed. The clutch ring 54, being splined on the low speed screw shaft, is thus caused to retard the backward rotation of the high speed clutch member 43 by virtue of the engagement of their teeth 57, 58, causing said clutch member to run off the ends of the threads 46 and thus index itself to a different position on the screw shaft. When forward movement of the pedals is then resumed, the clutch member 43 reenters the threads of its screw shaft in its indexed position whereby the recesses 52, 53 are out of registry with the projections 49, 51 of the spacing ring 48 which therefore arrest the movement of said clutch member before it can engage the hub. As soon as the speed of the low speed screw shaft exceeds that of the hub 22, the low speed driving clutch member 35 is traversed into driving engagement with the hub and operation in low gear ensues. Shifting back into high gear is accomplished in the same manner by a second indexing operation which brings the notch 53 of clutch member 43 into registration with the projection 49 of the spacing ring 48, and recess 52 into registry with projection 51.

Application of the brake is brought about in the usual manner by further backward rotation of the pedals, which traverses the low speed driving clutch member 35 to the right, compressing the spring 38, and bringing the teeth 36 of said clutch member into engagement with the teeth 37 of expander member 32. In such traversal by backward rotation of the low speed screw shaft 7, the frictional drag of sleeve 33 as it bears against the thrust washer 39 assists the spring drag ring 41 in resisting rotation of the clutch member 35 to bring about such traversal.

Although but one embodiment of the invention has been shown and described in detail it will be understood that other embodiments are possible and changes may be made in the design and arrangement of the parts without departing from the spirit of the invention.

I claim:

1. In a variable-speed transmission for bicycles and the like, a fixed axle, a low-speed screw shaft rotatably mounted thereon, a driving member including a high-speed screw shaft rotatably mounted on the low-speed screw shaft, reduction gearing for rotating the low-speed screw shaft from the driving member, a hub rotatably mounted on the driving member having a low-speed clutch surface and a high-speed clutch surface, a low-speed driving clutch member threaded on the low-speed screw shaft for movement into and out of driving engagement with the low speed clutch surface of the hub, a high-speed driving clutch member threaded on the high-speed screw shaft for movement into and out of driving engagement with the high-speed clutch surface of the hub, means for preventing such engagement of the high speed clutch member, and means responsive to backward rotation of the driving members for rendering said preventing means inoperative.

2. A variable-speed transmission as set forth in claim 1 in which the means for preventing engagement of the high-speed clutch member comprises an abutment member in the path of movement of said clutch member having a projection adapted to arrest the engagement movement thereof, and means responsive to backward rotation of the driving member for controlling the effectiveness of said projection to arrest the clutch member.

3. A variable speed transmission as set forth in claim 2 in which the high speed clutch member is provided with a recess adapted to receive said projection when brought into registry therewith and thereby prevent the projection from arresting the engaging movement of said clutch member, and means under the control of the operator for adjusting said clutch member to optionally place the recess into and out of position to register with said projection.

4. A variable speed transmission as set forth in claim 3 in which the high speed screw shaft is formed with a multi-lead thread for a portion only of its length, leaving a smooth portion which permits the high-speed clutch member to run off the ends of the threads, and including yielding means resisting such running off; said adjusting means including means responsive to backward rotation of the driving member to cause said clutch member to index itself on its screw shaft by running off the ends of the threads.

5. A variable speed transmission as set forth in claim 4 in which said adjusting means comprises a clutch ring splined on the low-speed screw shaft having a coupling surface, and means including a yielding element maintaining the clutch ring in position to cause said coupling surface to engage a cooperating surface on the high speed clutch member shortly before said high speed clutch member runs off the threads of its screw shaft.

6. In a two-speed gear drive for bicycle hubs or the like, a fixed axle, a low speed drive shaft journaled thereon, a driving member including a high-speed shaft rotatably mounted on the low-speed shaft, reduction gearing for rotating the low-speed shaft from the driving member, a wheel hub rotatably mounted on the driving member, a clutch member mounted on the high-speed shaft for rotary movement thereon and therewith, and for longitudinal movement thereon into and out of driving engagement with said hub, an abutment member on the high speed shaft, and means responsive to backward rotation of the driving member for optionally rendering the abutment member operative or inoperative to prevent the clutch member from engaging the hub.

7. A two-speed gear drive as set forth in claim 6 in which said abutment member is provided with a projection, and said clutch member is formed with a recess adapted to receive the projection when brought into registry therewith; and means under the control of the operator for indexing the clutch member on the high-speed shaft to bring said recess into and out of registry with the projection.

8. A two-speed drive as set forth in claim 7 in which said indexing means for the clutch member includes a disc splined on the low speed drive shaft, and means responsive to brackward rotation of the driving member for coupling the clutch member to said disc.

References Cited in the file of this patent
UNITED STATES PATENTS 832,706      Sturgess _____ Oct. 9, 1906